(12) United States Patent
Broach et al.

(10) Patent No.: US 7,265,530 B1
(45) Date of Patent: Sep. 4, 2007

(54) ADAPTIVE SLOPE COMPENSATION FOR SWITCHING REGULATORS

(75) Inventors: Michael Eugene Broach, San Mateo, CA (US); Frank John De Stasi, San Leadro, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 117 days.

(21) Appl. No.: 10/780,375

(22) Filed: Feb. 17, 2004

Related U.S. Application Data

(63) Continuation-in-part of application No. 10/703,960, filed on Nov. 7, 2003, now Pat. No. 7,042,207.

(51) Int. Cl.
*G01R 15/20* (2006.01)

(52) U.S. Cl. .................................. 324/117 R

(58) Field of Classification Search .............. None
See application file for complete search history.

(56) References Cited

U.S. PATENT DOCUMENTS

| | | | | |
|---|---|---|---|---|
| 4,127,894 A | | 11/1978 | Bishop et al. ................ 363/56 |
| 4,403,279 A | * | 9/1983 | Hirsch et al. ................ 323/222 |
| 4,439,822 A | | 3/1984 | Cocconi ....................... 363/56 |
| 4,672,518 A | | 6/1987 | Murdock ...................... 363/21 |
| 4,717,994 A | | 1/1988 | Diaz et al. .................... 363/21 |
| 4,837,495 A | * | 6/1989 | Zansky ........................ 323/222 |
| 4,975,820 A | | 12/1990 | Szepesi ........................ 363/21 |
| 5,079,453 A | * | 1/1992 | Tisinger et al. ............. 327/132 |
| 5,315,498 A | * | 5/1994 | Berrios et al. ............... 363/98 |
| 5,731,731 A | * | 3/1998 | Wilcox et al. ............... 327/403 |
| 5,903,452 A | | 5/1999 | Yang ............................ 363/97 |
| 5,929,620 A | * | 7/1999 | Dobkin et al. ............... 323/288 |
| 6,177,787 B1 | * | 1/2001 | Hobrecht ..................... 323/283 |
| 6,282,102 B1 | | 8/2001 | Minamisawa et al. ........ 363/16 |
| 6,282,111 B1 | | 8/2001 | Illingworth ................... 363/98 |
| 6,487,099 B1 | | 11/2002 | Perkins et al. ............... 363/98 |
| 6,498,466 B1 | * | 12/2002 | Edwards ...................... 323/282 |
| 6,522,116 B1 | * | 2/2003 | Jordan ......................... 323/282 |
| 6,611,131 B2 | * | 8/2003 | Edwards ...................... 323/282 |
| 6,661,224 B1 | * | 12/2003 | Linder ......................... 324/227 |

(Continued)

OTHER PUBLICATIONS

Ronald I. Birdsall, "Proceedings of Powercon7," *Power Concepts, Inc.*, Mar. 24-27, 1980 (12 pages).

(Continued)

*Primary Examiner*—Jermele Hollington
(74) *Attorney, Agent, or Firm*—Brett A. Hertzberg; Merchant & Gould PC

(57) ABSTRACT

A system, method, and apparatus are arranged to provide adaptive slope compensation in a switching regulator that includes an inductor. A control loop of the switching regulator is responsive to a ramp signal. A ramp generator that includes a capacitor circuit and a current source provides the ramp signal, where at least one of the current level of the current source and the value of the capacitor circuit are adjusted to vary the slope of the ramp signal. The adjustment of the ramp signal is responsive to at least one of: a set point for the output voltage of the switching regulator, a feedback voltage that is related to the output voltage, and a measured parameter associated with the inductor in the switching regulator. By dynamically adjusting the slope of the ramp signal, slope compensation is provided for a range of inductor values that can dynamically change during operation.

13 Claims, 12 Drawing Sheets

U.S. PATENT DOCUMENTS

| | | | |
|---|---|---|---|
| 6,828,766 B2* | 12/2004 | Corva et al. | 323/284 |
| 2006/0006854 A1* | 1/2006 | Oswald et al. | 323/282 |
| 2006/0043951 A1* | 3/2006 | Oswald et al. | 323/282 |
| 2006/0284607 A1* | 12/2006 | Isobe | 323/282 |
| 2007/0013355 A1* | 1/2007 | Liao | 323/288 |

OTHER PUBLICATIONS

"LM2621 Low Input Voltage, Step-Up DC-DC Converter," *National Semiconductor Corporation*, Feb. 2000 (10 pages).

"LM78S40 Switching Voltage Regulator Applications," *National Semiconductor Corporation*, Mar. 2000 (17 pages).

"Wide-Input, High Voltage Buck Converter," *National Semiconductor Corporation*, Sep. 2002 (3 pages).

"Introduction to Power Supplies," *National Semiconductor Corporation*, Sep. 2002 (7 Pages).

"Modelling, Analysis and Compensation of the Current-Mode Converter," *Unitrode Corporation* (7 pages).

"UC3842/3/4/5 Provides Low-Cost Current-Mode Control," *Unitrode Corporation* (14 pages).

C. K. Tse, et al., "Control of Bifurcation in Current-Programmed DC/DC Converters: A Reexamination of Slope Compensation," *IEEE International Symposium on Circuits and Systems Geneva 2000*, May 28-31, 2000, vol. 4 —pp. 671-674.

C. K. Tse, et al., "Control of Bifurcation in Current-Programmed DC/DC Converters: An Alternative Viewpoint of Ramp Compensation," *IEEE 26th Annual Conference of Industrial Electronics Society*, Oct. 22-28, 2000, vol. 4 —pp. 2413-2418.

Chung-Chieh Fang, "Exact Orbital Stability Analysis of Static and Dynamic Ramp compensations in DC-DC Converters," *IEEE International Symposium on Industrial Electronics*, Jun. 12-16, 2001, vol. 3, pp. 2124-2129.

* cited by examiner

ADAPTIVE SLOPE COMPENSATION FOR SWITCHING REGULATORS

RELATED APPLICATION

This patent application is a continuation-in-part of U.S. patent application Ser. No. 10/703,960, which was filed Nov. 7, 2003 now U.S. Pat. No. 7,042,207, and claims the benefit under 35 U.S.C. 120 of the filing date.

FIELD OF THE INVENTION

The present invention relates to a system and method for adaptively adjusting parameters in a switching regulator based on a slope that is associated with an inductor in the switching regulator. The adaptive adjustment method is appropriate for use in a switching regulator such as a buck regulator, a boost regulator, or a buck-boost regulator.

BACKGROUND OF THE INVENTION

Opposite polarity pulses can be applied to a transformer in a pulse-width-modulated (PWM) power converter. The secondary winding of the transformer is connected to additional circuitry such as a passive filter to generate an average output voltage. The average output voltage is related to the pulse-width by the volts-seconds rule and the characteristics of the transformer.

An example push-pull type PWM converter is illustrated in FIG. 1. As illustrated in FIG. 1, transformer T1 conducts current (IC1, IC2) from the BP power supply terminal through transistors Q1 and Q2. For example, the primary winding of transformer T1 conducts current IC1 when transistor Q1 is activated, while the primary winding of transformer T1 conducts current IC2 when transistor Q2 is activated. Diodes D1 and D2 operate on opposite polarity cycles to provide current (either ID1 or ID2) through inductor L to a load (not shown). Capacitor C0 is filter ripple in the output voltage (VO).

Ideally, transistors Q1 and Q2 are activated for equal amounts of time via drive signals DRV1 and DRV2 such that the volt-second integral of the pulses applied to the transformer corresponds to zero and the transformer core does not saturate. However, non-ideal switching times for transistors Q1 and Q2 may result in unequal cycle times such that the transformer core is driven into saturation. Core saturation in a PWM converter may result in secondary effects such as breakdown in the switching transistors (Q1, Q2), excessive voltage and current stress on the rectifier diodes (D1, D2), as well as EMI related problems.

BRIEF DESCRIPTION OF THE DRAWINGS

Non-limiting and non-exhaustive embodiments of the present invention are described with reference to the following drawings.

DETAILED DESCRIPTION OF THE PREFERRED EMBODIMENT

Figure 1:
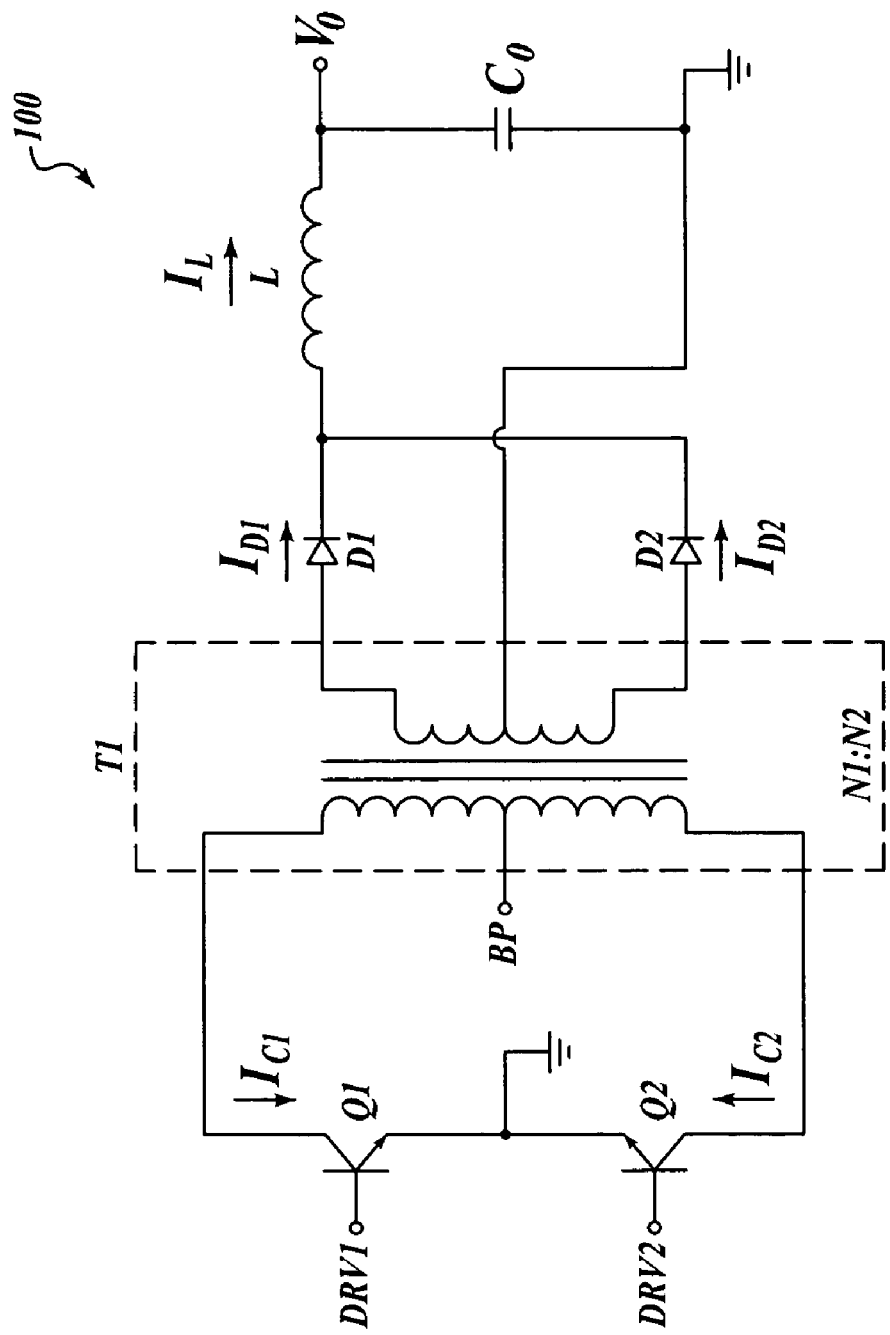
FIG. 1 is an illustration of a conventional push-pull type PWM converter.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context clearly dictates otherwise. The meanings identified below are not intended to limit the terms, but merely provide illustrative examples for the terms. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected or an indirect connection through one or more passive or active intermediary devices. The term "circuit" means either a single component or a multiplicity of components, either active and/or passive, that are coupled together to provide a desired function. The term "signal" means at least one current, voltage, charge, temperature, data, or other signal.

Briefly stated, the invention is related to a system, method, and apparatus for providing adaptive slope compensation in a switching regulator that includes an inductor. A control loop of the switching regulator is responsive to a ramp signal. A ramp generator that includes a capacitor circuit and a current source provides the ramp signal, where at least one of the current level of the current source and the value of the capacitor circuit are adjusted to vary the slope of the ramp signal. The adjustment of the ramp signal is responsive to at least one of: a set point for the output voltage of the switching regulator, a feedback voltage that is related to the output voltage, and a measured parameter associated with the inductor in the switching regulator. By dynamically adjusting the slope of the ramp signal, slope compensation is provided for a range of inductor values that can dynamically change during operation.

Measured Inductor Characteristics

Inductors in switching electronic circuits are typically made out of ferrites or some other core material that has a higher permeability than air. Unlike air core inductors, the amount of current flowing in these inductors is constrained by the quality and quantity of the core material. Once the inductor's operating current exceeds a saturation point, the inductor's effectiveness is reduced and the rate of increase in the current relative to the applied voltage rises measurably. The inductor voltage ($V_L$) and the inductor current ($I_L$) are related to one another by: $\Delta I_L/\Delta t = \Delta V_L/L$.

Magnetic load applications such as motor drivers and switched-mode power supplied (SMPS) incorporate current limiting circuits to protect the control circuits (e.g., drivers, inductive elements, etc.) from currents that are sufficient to cause saturation and induce destructive currents. For example, in a SMPS the saturation current should always be greater than the current limit in the controller.

The various measurements of voltages and/or currents can be used to calculate values of characteristics associated with the inductor. Example characteristics include: inductor value, series resistance, slew rate in non-saturation, slew rate in saturation, average operating current, as well as others. Inductors with different core materials have different characteristic curves (e.g., the saturation and non-saturation slew rates change based on the type of core material) such that the type of core material and the value of the inductor can be determined (e.g., a lookup table that identifies the core material type based on characteristic measurements). The characteristic measurements can also be used in a control system such as in a switching-type converter (or regulator) to adaptively change control parameters such as: current limit, switching time, small signal compensation, and slope compensation.

Conventional circuits often include compensation to prevent undesirable effects such as oscillations, or some other instability or non-linearity in the control loop. In the present invention, characteristics associated with the inductor are measured and various control parameters associated with compensation of the circuit are dynamically adjusted by the control circuit to accommodate a wide range of inductor values and saturation ratings. In one example, a parameter in the control loop is dynamically adjusted (e.g., additional current sources are enabled, a feedback amount is changed, a gain is adjusted, etc.) to change the compensating ramp associated with the inductor. In another example, a parameter in the control loop is dynamically adjusted based on the rate of discharge in the inductor to change the slope compensation for the inductor.

Figure 2:
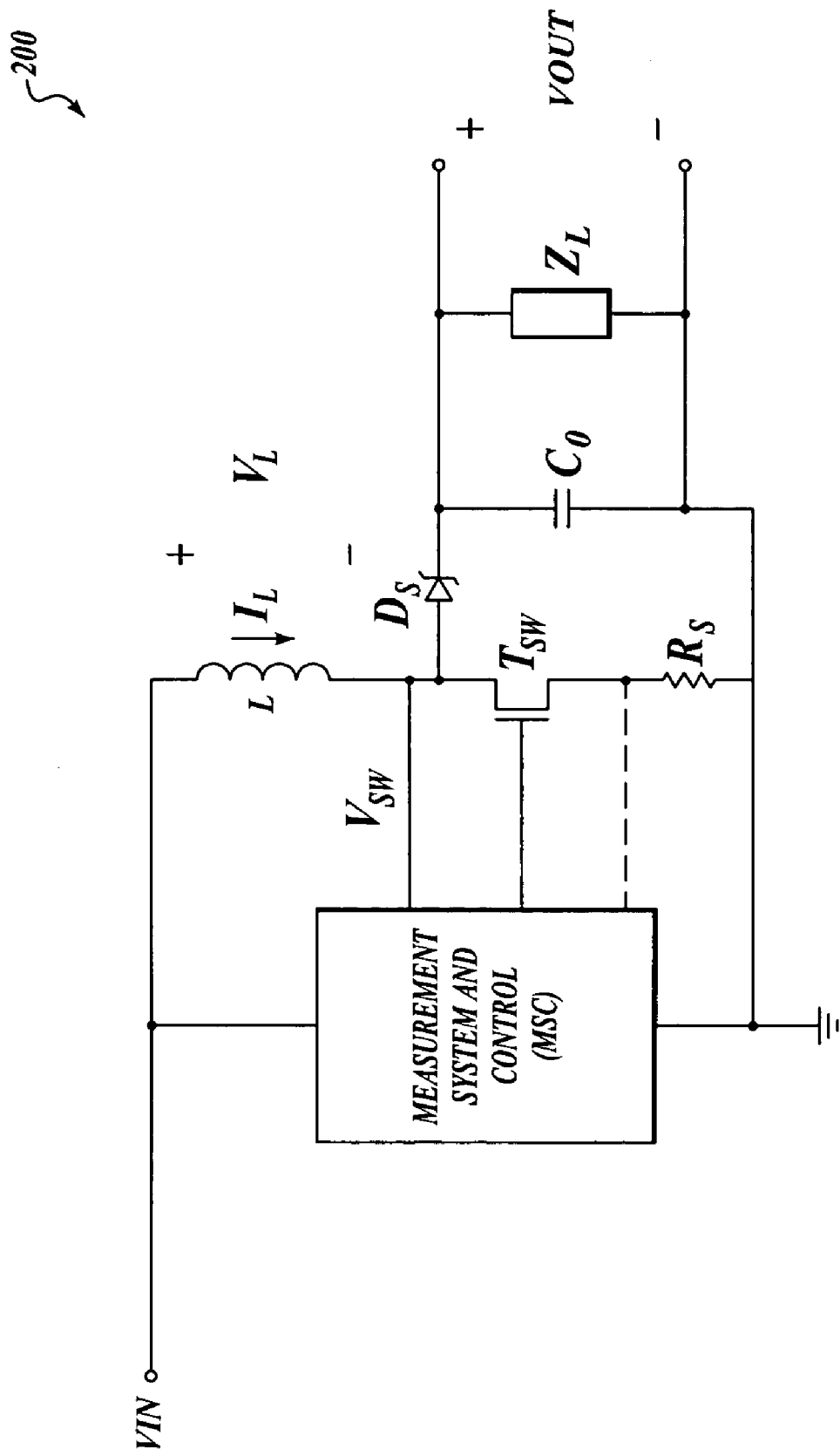
FIG. 2 is an illustration of an example embodiment of a switching converter.

FIG. 2 is an illustration of an example embodiment of a switching converter (200) that is arranged according to an aspect of the present invention. Switching converter 200 includes an inductor (L), a switching transistor ($T_{SW}$), a diode ($D_S$), a capacitor ($C_O$), a load circuit ($Z_L$), and a measurement and system control (MSC) block.

Inductor L is charged when switching transistor $T_{SW}$ is active. Inductor current ($I_L$) is delivered to capacitor $C_O$ and load circuit $Z_L$ via diode $D_S$ when transistor $T_{SW}$ is inactive. In a normal operating mode, the MSC block is arranged to actuate switching transistor $T_{SW}$ such that inductor L is periodically charged. The MSC block is further arranged to monitor the voltages and currents associated with inductor L when the switching converter 200 is operated in a measurement mode, and provides a measurement of the inductance value based on those measurements.

The change in inductor voltage ($\Delta V_L$) is determined by monitoring the input voltage ($V_{IN}$) and the switch voltage ($V_{SW}$). In one example embodiment, the change in inductor current ($\Delta I_L/\Delta t$) is determined by monitoring the change in voltage across the switching transistor ($\Delta V_{DS}$) and calculating: $(\Delta I_L/\Delta t)=(\Delta V_{DS}/\Delta t)/\text{rdson}$, where rdson is the on resistance of switching transistor $T_{SW}$. An optional resistor ($R_S$) may be placed in series with switching transistor $T_{SW}$ to facilitate measurement of the inductor current.

Figure 3:
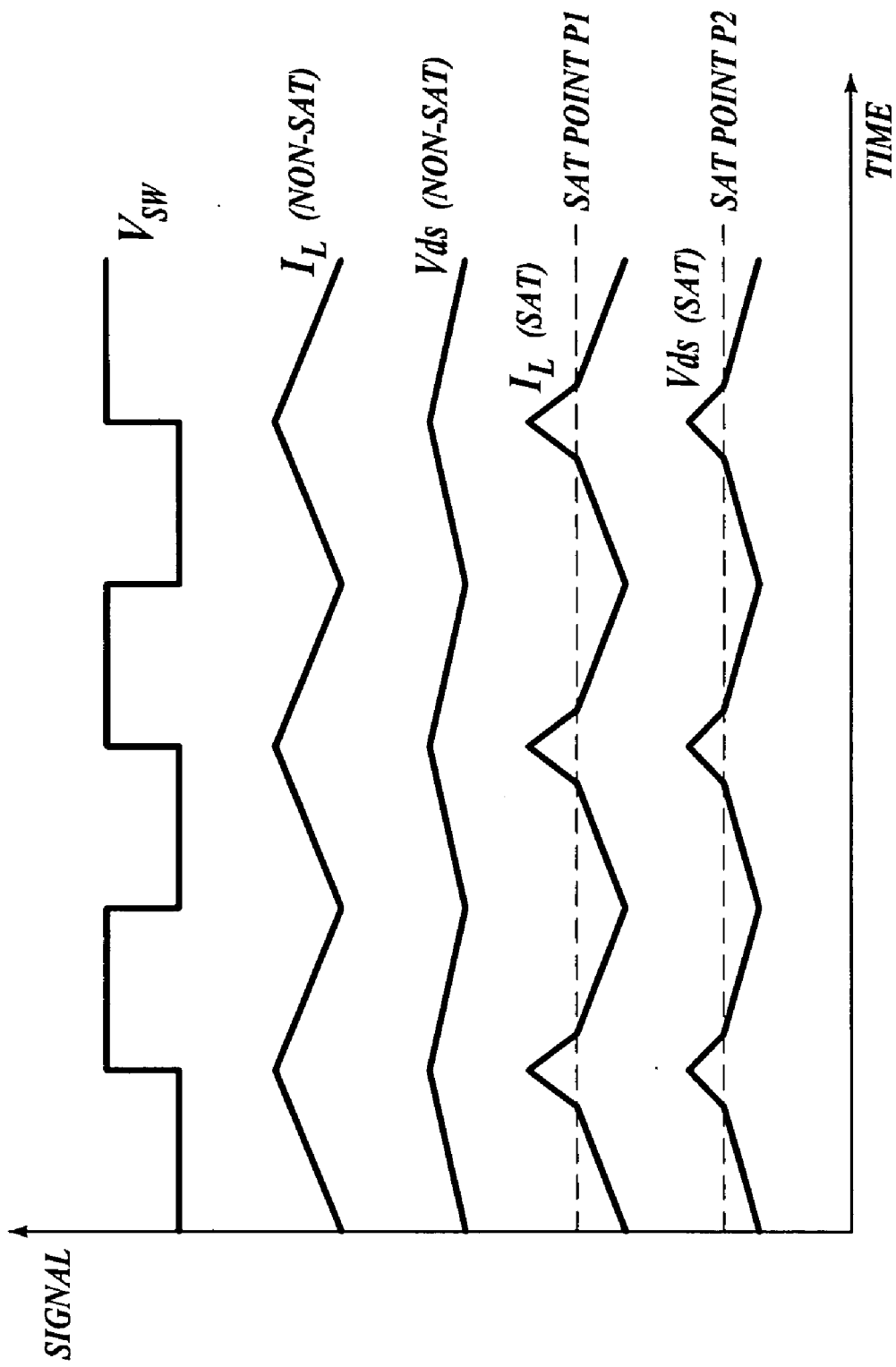
FIG. 3 is an illustration of example waveforms for a switching converter.

FIG. 3 is an illustration of example waveforms for a switching converter such as that illustrated in FIG. 2. Ideally, the inductor does not reach a saturation point and the inductor current ($I_L$) and the voltage across transistor $T_{SW}$ ($V_{DS}$) changes linearly in proportion to the value of the inductor. The non-ideal effects of inductor saturation are also illustrated as the inductor current ($I_L$) and the voltage across transistor TSW ($V_{DS}$) experience a measurable change in slope when the saturation points ($P_1$ and $P_2$) are reached. The voltage across resistor $R_S$ (when found in circuit 200) has the same shape as $V_{DS}$.

Figure 4:
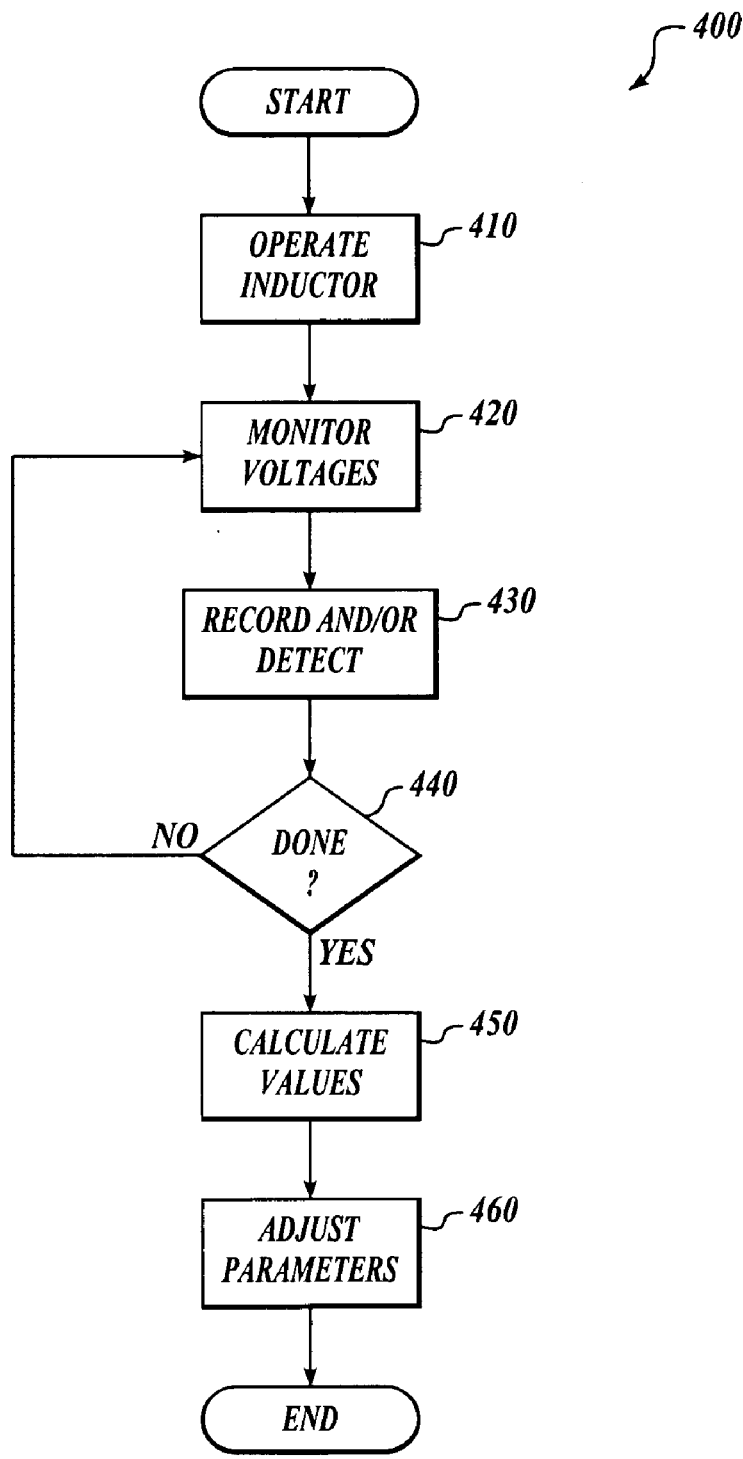
FIG. 4 is an illustration of a procedural flow for an example measurement system.

FIG. 4 is an illustration of a procedural flow for an example measurement system that is useful for the present invention. After the measurement mode is activated by some triggering event, processing continues at block 410 where the inductor is operated for one or more cycles. At block 420, voltages (e.g., $V_{IN}$, $V_{SW}$, $V_{DS}$, $V_{RS}$, etc.) associated with the inductor are monitored (420) while the inductor is operated. At block 430, the monitored voltages are recorded and/or used to detect the saturation point (depending on the circuit implementation). From decision block 440, the process returns to block 420 when additional monitoring is necessary. Processing continues to block 450 when no additional voltages need be monitored. At block 450 values associated with the inductor (e.g., inductance value, slew rate, saturation point, etc.) are calculated. The calculated values can be used by other circuits or systems to adjust one or more parameters (e.g., current limit, slope compensation, etc).

In one example, voltages are monitored by an analog-type circuit that detects the change in slope associated with the current and/or voltage associated with the inductor. In another example, the inductor voltages are monitored by an analog-to-digital converter. In this example, either the digital values can be recorded in a memory and later retrieved for calculation purposes, or the digital values can be evaluated in real time to determine the rate of change in the voltages. In a further example, the digital values can be processed (e.g., averaged, throwing out extreme values, filtered, etc.) over many operating cycles of the inductor to minimize the effects of noise and switching transients on the measurement values. The processing of the digital values can be provided as a post-processing function or in real-time based on the processing power of the system implementation.

Figure 5:
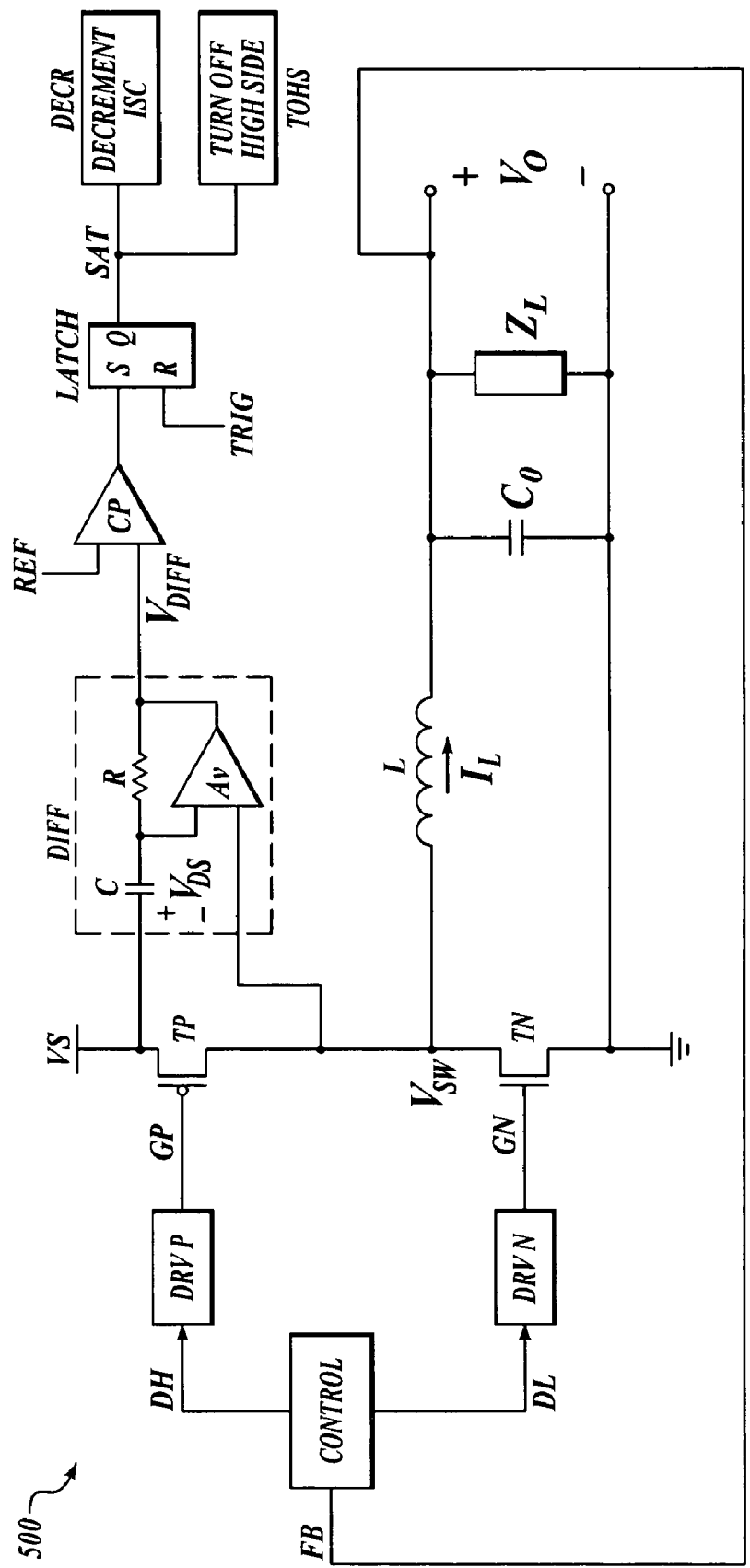
FIG. 5 illustrates another example embodiment of a switching converter with analog differentiator processing system.

FIG. 5 illustrates another example embodiment of a switching converter (500) that is arranged in accordance with an aspect of the present invention. Switching converter 500 is a buck-type converter that includes a p-type transistor ($T_P$), and n-type transistor ($T_N$), drivers (DRV$_P$, DRV$_N$), a controller (CNTL), a differentiator (DIFF), a comparator (CP), an SR-type latch (LATCH), a decrement circuit (DECR), a high-side turn-off circuit (TOHS), an inductor (L), a capacitor ($C_O$), and a load circuit ($Z_L$).

The controller (CNTL) is arranged to provide drive signals $D_H$ and $D_L$ to drivers DRV$_P$ and DRV$_N$, respectively. Driver DRVP provides a gate control signal ($G_P$) to p-type transistor $T_P$, while driver DRVN provides another gate control signal ($G_N$) to n-type transistor $T_N$. The p-type transistor ($T_P$) is arranged to operate as a high side switch that couples the inductor (L) to the high power source ($V_S$).

The n-type transistor ($T_N$) is arranged to operate as a low side switch that couples the inductor (L) to the low power source (e.g., GND). Capacitor $C_O$ is coupled in parallel with load circuit $Z_L$. A feedback signal (FB) is provided from $V_O$ to the controller (CNTL).

An example differentiator illustrated in FIG. 5 includes a capacitor (C), a resistor (R), and an amplifier ($A_V$). The differentiator is arranged to monitor the drain-source voltage ($V_{DS}$) of p-type transistor $T_P$ and provide a signal ($V_{DIFF}$) that is proportional to $\Delta V_{DS}/\Delta t$. The signal ($V_{DIFF}$) is used to adjust parameters within the circuit such as, for example, small-signal compensation, slope compensation, and current limit.

Figure 6:
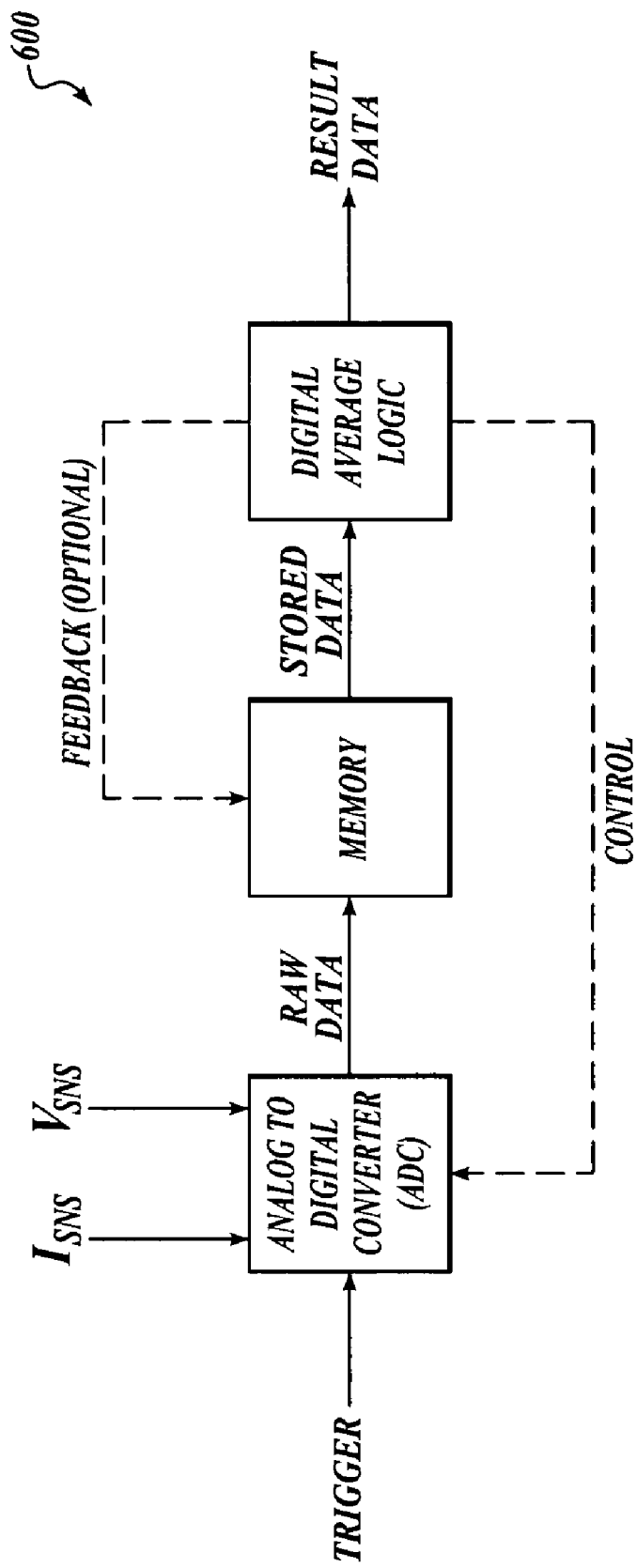
FIG. 6 illustrates an example of a digital processing circuit.

FIG. 6 illustrates an example of a digital processing circuit (600) that is arranged in accordance with aspects of the present invention. The digital processing circuit (600) includes an analog-to-digital converter (ADC) circuit, a memory circuit, and a digital processing logic (DPL) circuit. The ADC circuit is activated by a trigger mechanism (TRIGG) and converts a series of measurement signals (ISNS, VSNS, etc) to a data stream (raw data). The data stream is received by the memory circuit for storage. Data in the memory circuit can be retrieved by the DPL circuit for further processing.

In one example, the memory circuit stores sampled data points that are utilized to find the value of $\Delta V_{DS}/\Delta t$, where the DPL circuit is arranged to calculate the value after all of the sampled points are stored. In another example, the memory circuit stores values that correspond to an average value, and the DPL circuit calculates a running average. The DPL circuit can further be arranged to: locate the saturation point of the inductor, calculate the slope of the inductor current, filter noise from the sampled data, discard anomalous data from the sampled data points, determine an appropriate current limit, determine a slope compensation parameter(s), determine a small-signal compensation parameter(s), as well as provide other calculations.

Slope Compensation Generally

Current mode control topologies can be applied to buck, boost, buck-boost, and other switching type converters/regulators. One example conventional buck regulator is operated at a fixed frequency with current mode control that includes peak current sensing for the inductor. Non-ideal effects are observed in this example regulator such as: an instability for duty cycles above 50%, poor loop response as the result of peak sensing instead of average inductor current, tendencies towards sub-harmonic oscillations, and poor noise sensitivity. The above-described instabilities are independent of regulator topology and may occur even when the voltage regulation loop is operated open loop. These and other non-ideal effects are addressed by adaptively adjusting the slope of the compensating ramp that is associated with the inductor current in accordance with the present invention.

According to an example of the present invention, a timing ramp is introduced into the current programming control loop. The slope of the inductor current determines the preferred amount of compensation that is provided by the slope ($m_e$) of the timing ramp. According to the present invention, the slope of the ramp ($m_e$) is related to a slope of the inductor current according to a scaling factor. In one example, the slope of the ramp ($m_e$) corresponds to a fraction of the downward slope associated with the inductor current ($m_2$). In another example, the slope of the ramp ($m_e$) corresponds to a multiple of the downward slope associated with the inductor current ($m_2$). In yet another example, the slope of the ramp ($m_e$) is matched to the downward slope associated with the inductor current ($m_2$).

The topology selected and the desired optimization factor for the converter/regulator will dictate the selection of the scaling factor. The value of the downward slope of the inductor current ($m_2$) depends on the regulator topology, the value associated with the inductor, as well as other system parameters. An example buck or buck-boost regulator may have a downward slope ($m_2$) that is determined by the ratio of the output voltage ($V_{OUT}$) and the inductor value (L) as: $m_2 = V_{OUT}/L$. In contrast, an example boost regulator may have a downward slope ($m_2$) that is related to the inductor value (L), and the difference between the input voltage ($V_{IN}$) and the output voltage ($V_{OUT}$) as: $m_2 = (V_{OUT} - V_{IN})/L$. In each case, the downward slope ($m_2$) is inversely proportional to the value associated with the inductor (L).

The value associated with the inductor (L) can vary during operation. This is largely the result of the various materials that are used in the inductor. Many power inductors are built with a core material that exhibits some change in permeability with flux density. The flux density depends on the magnitude of operating current in the inductor. In a regulator system, the inductor current is largely dependent on the load current for the system. Since the load current may change over time, the flux density of the inductor will change accordingly. Moreover, it may be desirable to support a range of inductor values so that the system designer for the regulator is afforded some flexibility in design and suppliers for the inductors.

As described previously, a measurement signal can be generated that is proportional to a value associated with the inductor (L). According to the present invention, the measurement signal can be used to adjust the slope of the compensation ramp ($m_e$) to compensate for changes in L. By dynamically adjusting the slope of the compensation ramp ($m_e$), large variations in the inductance value (L) can be accommodated without changing the internal constants of the regulator.

Example Slope Compensation Mechanism for Buck and Buck-Boost Type Regulators

Figure 7:
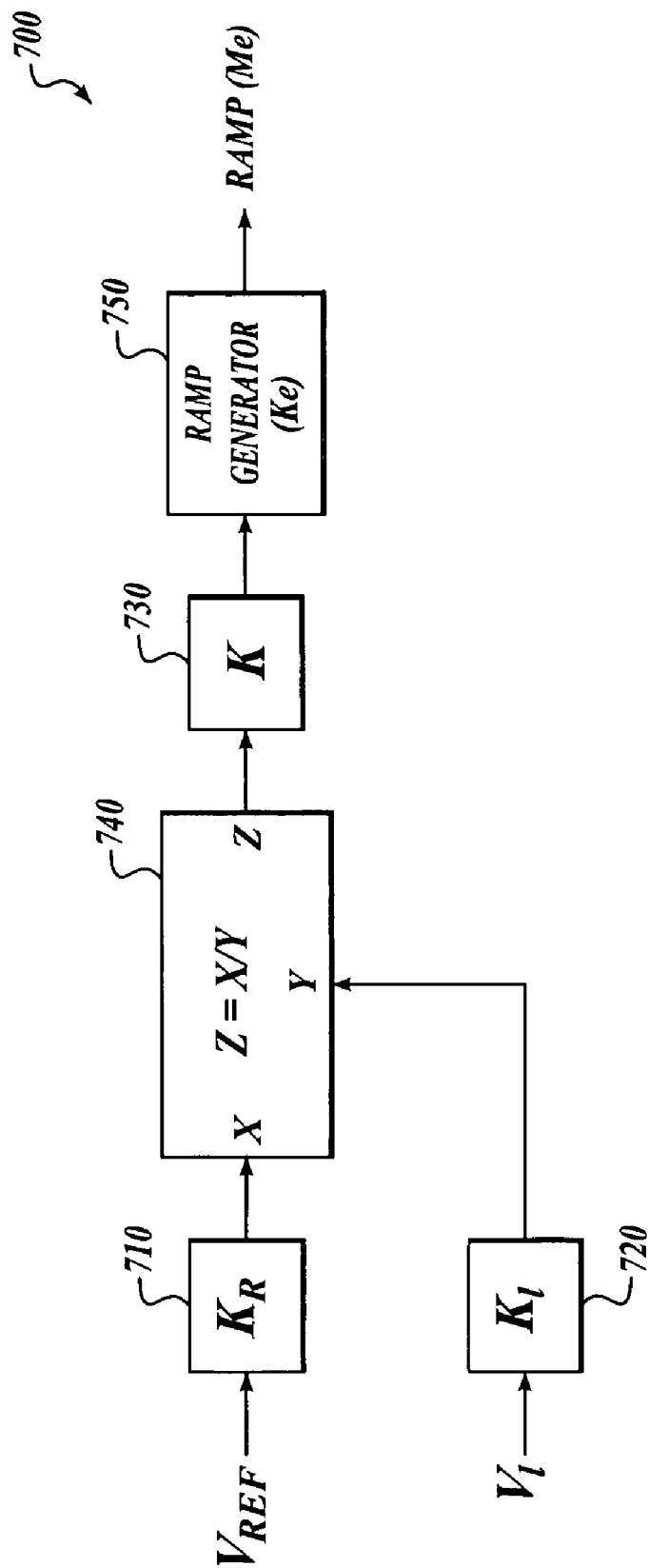
FIG. 7 illustrates an example block diagram of a dynamic slope adjustment mechanism for a buck or buck-boost type regulator.

FIG. 7 illustrates an example block diagram (700) of a dynamic slope adjustment mechanism for a buck or buck-boost type regulator that is arranged according to an aspect of the present invention. The block diagram includes three gain blocks (710, 720 and 730), a divider block (740), and a ramp generator block (750). Although illustrated as separate functional blocks, the functions illustrated in block diagram 700 can be combined and/or separated as may be desired in a particular implementation.

The first gain block (710) is arranged to: receive an input signal ($V_{REF}$) that is proportional to the output voltage ($V_{OUT}$) of the regulator, and provide a scaled signal that is related to the input signal ($V_{REF}$) according to a first constant ($K_R$). The second gain block (720) is arranged to: receive an input signal ($V_1$) that is proportional to the value of the inductor (e.g., by measuring the inductor value as previously described), and provide a scaled signal that is related to the input signal ($V_1$) according to a second constant ($K_1$). The divider block (740) is arranged to: receive the scaled signals from the first and second gain blocks via terminals X and Y, and provide a ratio signal that is proportional to the ratio of the signals from the X and Y terminals (e.g., Z=X/Y). The third gain block (730) is arranged to: receive the ratio signal (e.g., X/Y) from the divider block, and provide a scaled signal that is related to the ratio signal according to a third constant (K). The ramp generator block (750) is arranged to: receive the scaled signal from the third gain block, and provide a ramp signal (e.g., RAMP) that has a slope corresponding to $m_e$. The ramp generator block can optionally include another gain scaling coefficient that corresponds to $K_e$.

In one example, signal $V_{REF}$ is a constant signal that represents the desired output voltage (e.g., $V_{OUT}$) of the regulator. In another example, signal $V_{REF}$ is a signal that is directly proportional to the output voltage (e.g., $V_{OUT}$) of the regulator through some kind of feedback arrangement (e.g., a resistor divider).

The slope ($m_e$) of the ramp signal (e.g., RAMP) can be mathematically expressed as:

$$m_e = \frac{V_{REF}}{V_I} \cdot \frac{(K_R \cdot K \cdot K_e)}{K_I} \quad \text{(Eq.1)}$$

As described previously, the downward slope associated with the inductor current in a buck or buck-boost regulator can be expressed as:

$$m_2 = \frac{|V_{OUT}|}{L} \quad \text{(Eq.2)}$$

Since signal $V_{REF}$ is proportional to the output voltage ($V_{OUT}$) and signal $V_1$ is proportional to the value of the inductor (L), the value associated with the slope ($m_e$) of the ramp signal (RAMP) will track changes in the downward slope ($m_2$) of the inductor current (e.g., $I_L$). The various constants associated with the above-described function blocks (e.g., K, $K_e$, $K_R$ and $K_1$) can be adjusted to set the desired proportionality between slopes $m_e$ and $m_2$. According to the described slope adjustment method, the compensation ramp slope can be adjusted to compensate for the effects of variations in inductance values, and other parameters associated with the inductor current (e.g., $V_{IN}$, $V_{OUT}$, and load conditions).

Figure 8:
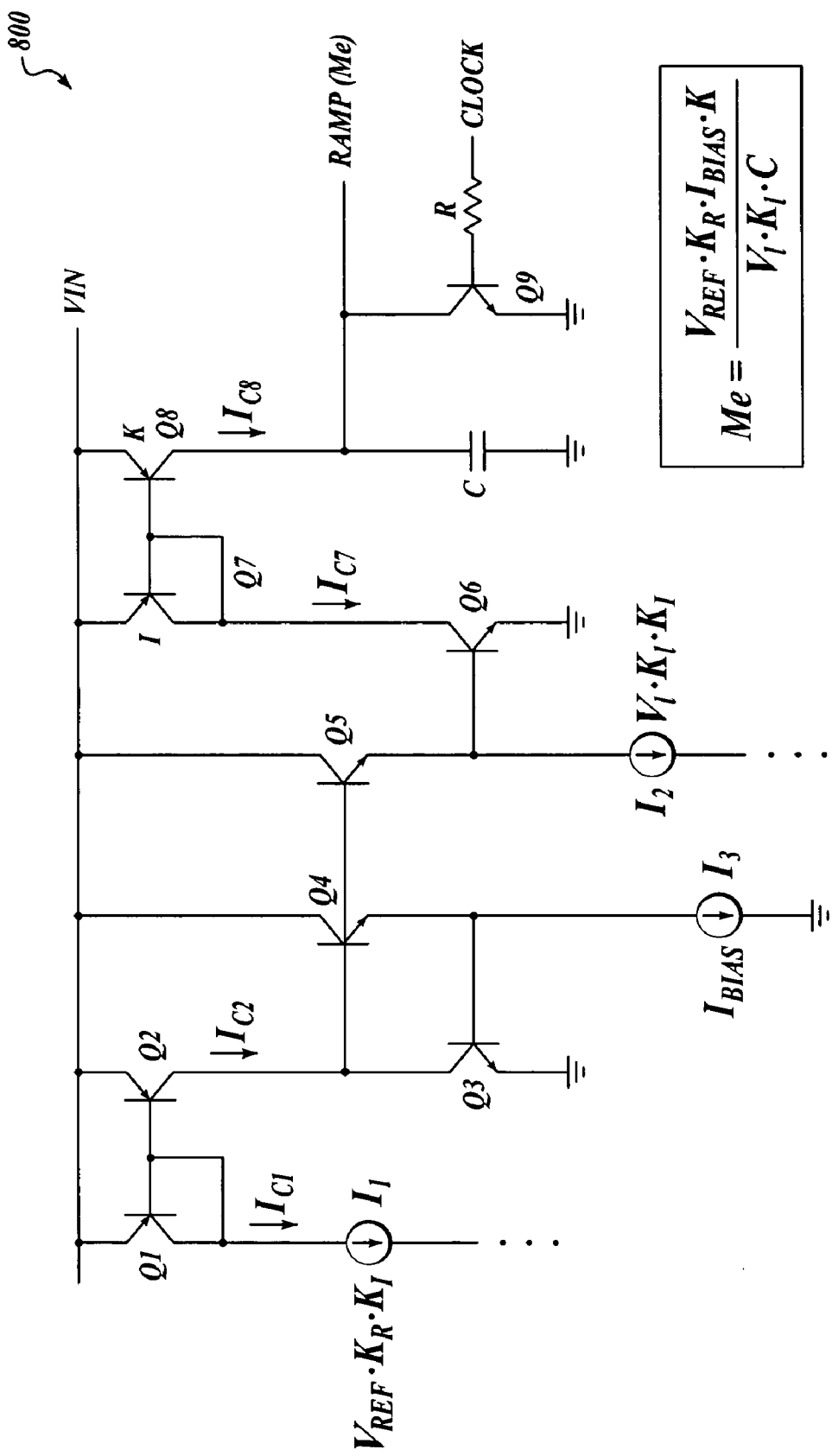
FIG. 8 illustrates an example schematic diagram for a circuit that is arranged to operate in accordance with the described block diagram illustrated by FIG. 7.

FIG. 8 illustrates an example schematic diagram for a circuit (800) that is arranged to operate in accordance with the described block diagram illustrated by FIG. 7. The example circuit includes nine transistors ($Q_1$-$Q_9$), three current sources ($I_1$-$I_3$), a capacitor (C), and a resistor (R).

Transistors $Q_1$ and $Q_2$ are arranged in a current-mirror configuration, where transistor $Q_1$ is arranged to sense the current from current source $I_1$, which has an operating current given by: $I_1 = V_{REF} * K_R * K_1$. Transistors $Q_2$ and $Q_3$ are arranged to cooperate with one another to provide a common control signal to transistors $Q_4$ and $Q_5$. Transistor $Q_4$ is arranged to cooperate with current source $I_3$, which is biased to provide current $I_{BIAS}$ to transistors $Q_3$ and $Q_4$. Transistor $Q_5$ is arranged to cooperate with current source $I_2$, which has an operating current given by $I_2 = V_1 * K_1 * K_1$. Transistor $Q_6$ is responsive to the signal provided by transistor $Q_5$ and current source $I_2$. Transistors $Q_7$ and $Q_8$ are arranged in a current-mirror configuration, where transistor $Q_7$ senses the current from transistor $Q_6$ and transistor $Q_8$ provides a scaled current according to scaling factor K. Transistor $Q_9$ is responsive to a clock signal (CLOCK) via resistor R such that the ramp signal (RAMP) is reset to a ground potential when transistor $Q_9$ is active. Capacitor C is arranged to receive the current from transistor $Q_8$ when transistor $Q_9$ is inactive such that the ramp signal is provided as a voltage across capacitor C.

The current ($V_{REF} * K_R * K_1$) associated with current source $I_1$ is proportional to the output voltage ($V_{OUT}$) through signal $V_{REF}$, while the current ($V_1 * K_1 * K_1$) associated with current source $I_2$ is proportional to the value of the inductance (L) of the power inductor. Transistors $Q_3$, $Q_4$, $Q_5$, and $Q_6$ are arranged to operate as a current divider that is responsive to currents $I_1$ and $I_2$. The output of the current divider is provided at the collector of transistor $Q_6$. The current mirror ratio for transistors $Q_7$ and $Q_8$ corresponds to (1:K), where K is a constant that can control the rate (slope) of the ramp signal (RAMP). The ramp generator portion of the circuit includes the collector current of transistor $Q_8$ and the value associated with capacitor C. Since the slope of the voltage across the capacitor is equal to $I_{C8}/C$, where $I_{C8}$ is the current from $Q_8$, the ramp signal (RAMP) has a slope ($m_e$) that is given by:

$$m_e = \frac{V_{REF}}{V_I} \cdot \frac{(K_R \cdot K)}{K_I} \cdot \frac{I_{BIAS}}{C} \quad \text{(Eq.3)}$$

Eq.3 is in substantially the same form as Eq.2 such that adjustment of various constants can be employed to adjust the slope of the ramp signal as previously described.

Example Slope Compensation Mechanism for Boost Type Regulators

Figure 9:
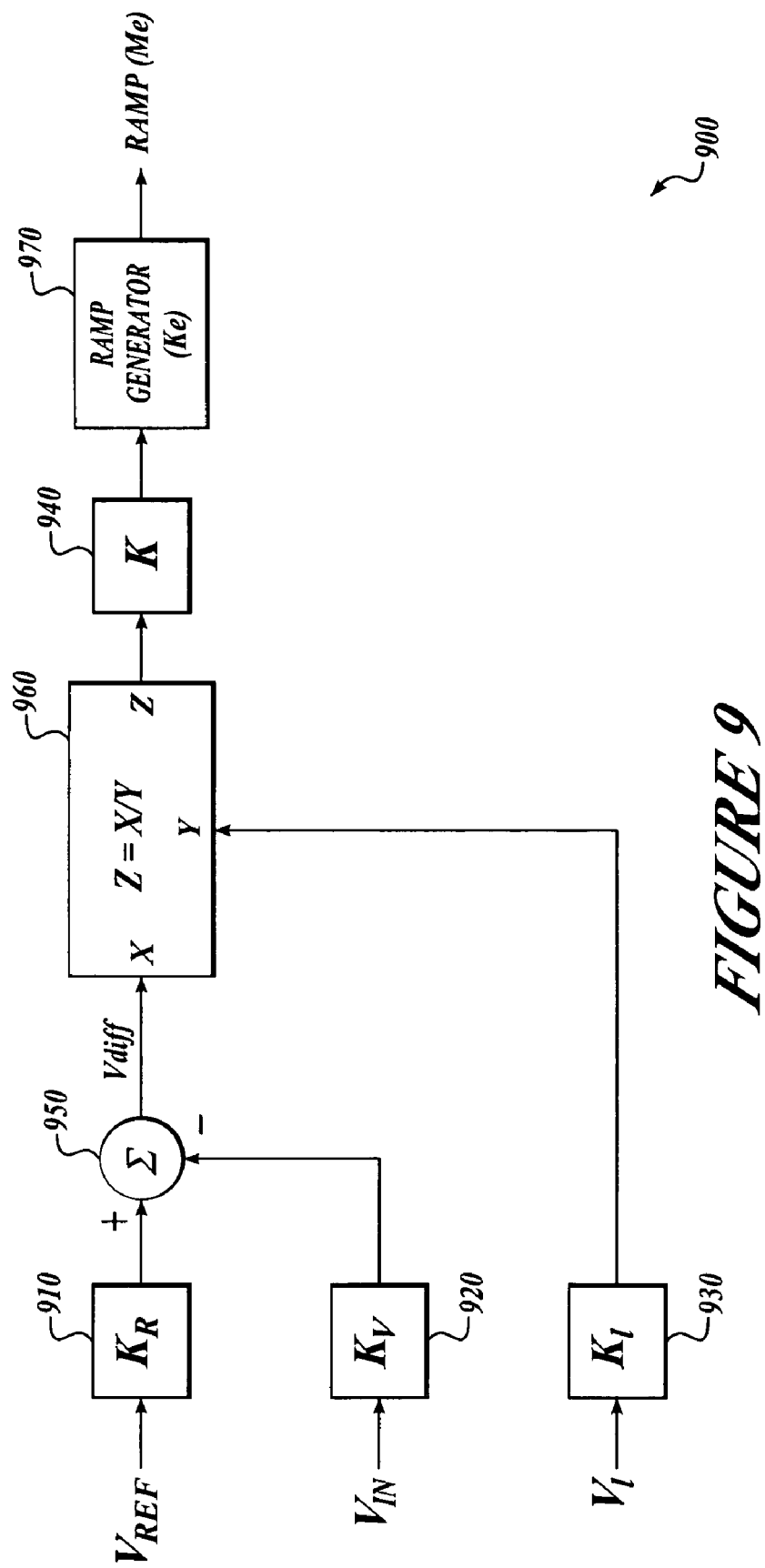
FIG. 9 illustrates an example block diagram (900) of a dynamic slope adjustment mechanism for a boost type regulator.

FIG. 9 illustrates an example block diagram (900) of a dynamic slope adjustment mechanism for a boost type regulator that is arranged according to an aspect of the present invention. The block diagram includes four gain blocks (910, 920, 930 and 940), a difference block (950), a divider block (960), and a ramp generator block (970). Although illustrated as separate functional blocks, the functions illustrated in block diagram 900 can be combined and/or separated as may be desired in a particular implementation.

The first gain block (910) is arranged to: receive an input signal ($V_{REF}$) that is proportional to the output voltage ($V_{OUT}$) of the regulator, and provide a scaled signal that is related to the input signal ($V_{REF}$) according to a first constant ($K_R$). The second gain block (920) is arranged to: receive an input signal ($V_{IN}$) that is proportional to the input voltage of the regulator, and provide a scaled signal that is related to the input signal ($V_{IN}$) according to a second constant ($K_V$). The third gain block (930) is arranged to: receive an input signal ($V_1$) that is proportional to the value of the inductor (e.g., by measuring the inductor value as previously described), and provide a scaled signal that is related to the input signal ($V_1$) according to a third constant ($K_1$). The difference block (950) is arranged to receive the scaled signals from the first and second gain blocks and provide a difference signal ($V_{DIFF}$) that is proportional to the difference between signals $V_{REF}$ and $V_{IN}$. The divider block (960) is arranged to: receive the scaled signals from the difference block and third gain blocks via terminals X and Y, and provide a ratio signal that is proportional to the ratio of the signals from the X and Y terminals (e.g., Z=X/Y). The fourth gain block (940) is arranged to: receive the ratio signal (e.g., X/Y) from the divider block, and provide a scaled signal that is related to the ratio signal according to a fourth constant (K). The ramp generator block (970) is arranged to: receive the scaled signal from the fourth gain block, and provide a ramp signal (e.g., RAMP) that has a slope corresponding to $m_e$. The ramp generator can optionally include another gain scaling coefficient that corresponds to $K_e$.

In one example, signal $V_{REF}$ is a constant signal that represents the desired output voltage (e.g., $V_{OUT}$) of the regulator. In another example, signal $V_{REF}$ is a signal that is directly proportional to the output voltage (e.g., $V_{OUT}$) of the regulator through some kind of feedback arrangement (e.g., a resistor divider).

The slope ($m_e$) of the ramp signal (e.g., RAMP) can be mathematically expressed as:

$$m_e = \frac{(V_{REF} \cdot K_R - V_{IN} \cdot K_V)}{V_I} \cdot \frac{(K \cdot K_e)}{K_I} \quad \text{(Eq.4)}$$

As described previously, the downward slope associated with the inductor current in a boost regulator can be expressed as:

$$m_2 = \frac{V_{OUT} - V_{IN}}{L} \quad \text{(Eq.5)}$$

Since signal $V_{REF}$ is proportional to the output voltage ($V_{OUT}$), signal $V_1$ is proportional to the value of the inductor (L), and signal $VI_N * K_V$ is proportional to the input voltage ($V_{IN}$), the value associated with the slope ($m_e$) of the ramp signal (RAMP) will track changes in the downward slope ($m_2$) of the inductor current (e.g., $I_L$). The various constants associated with the above-described function blocks (e.g., K, $K_e$, $K_R$, $K_V$ and $K_1$) can again be adjusted to set the desired proportionality between slopes $m_e$ and $m_2$. According to the described slope adjustment method, the compensation ramp slope can be adjusted to compensate for the effects of variations in inductance values, and other parameters associated with the inductor current (e.g., $V_{IN}$, $V_{OUT}$, and load conditions).

Figure 10:
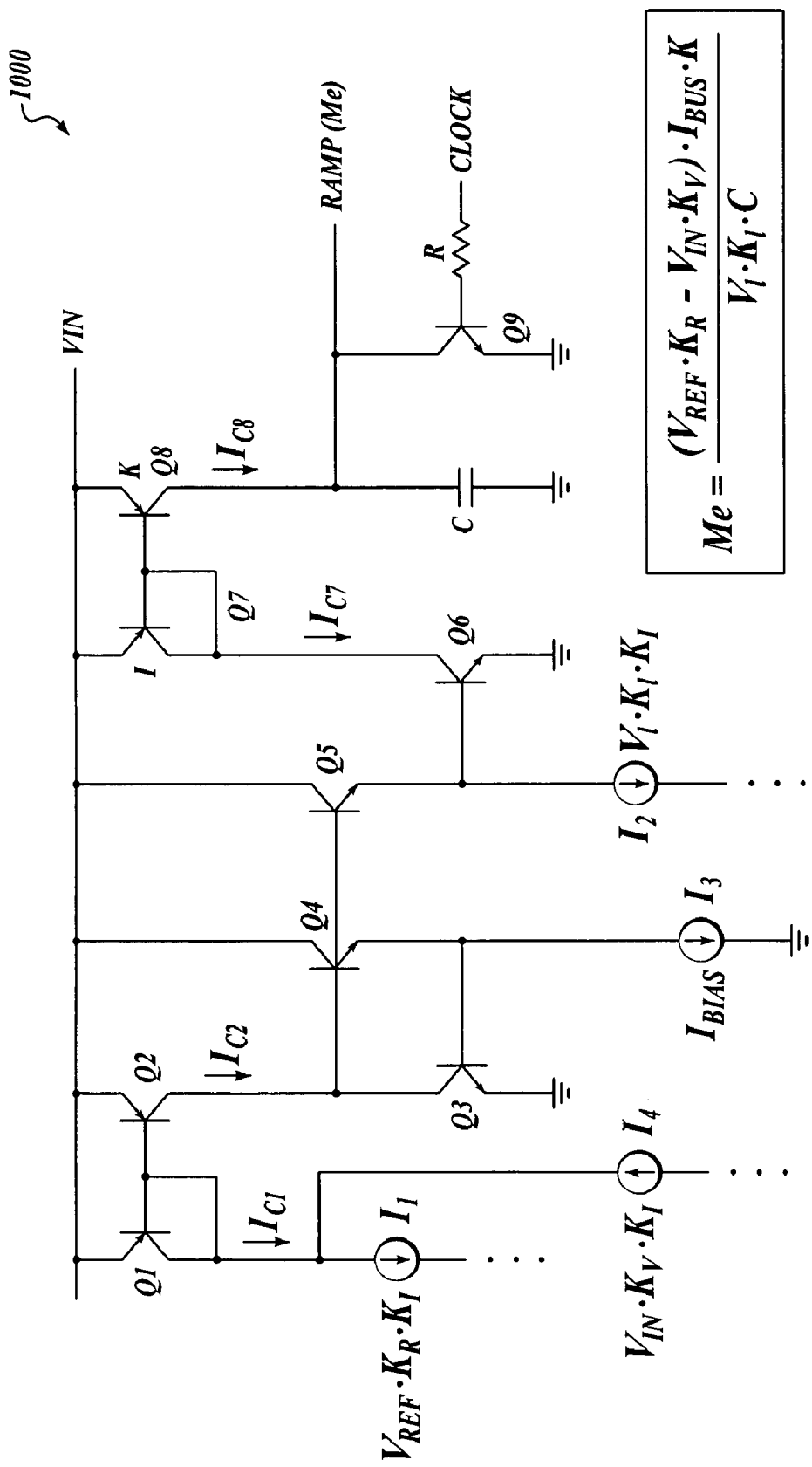
FIG. 10 illustrates an example schematic diagram for a circuit that is arranged to operate in accordance with the described block diagram illustrated by FIG. 9.

FIG. 10 illustrates an example schematic diagram for a circuit (1000) that is arranged to operate in accordance with the described block diagram illustrated by FIG. 9. Example circuit 1000 includes nine transistors ($Q_1$-$Q_9$), four current sources ($I_1$-$I_4$), a capacitor (C), and a resistor (R). FIG. 10 is substantially the same as FIG. 8 with the addition of current source $I_4$, which is coupled to the collector of transistor $Q_1$. Current source $I_4$ is arranged to provide a current that corresponds to $I_4 = V_{IN} * K_V * K_1$. With the addition of current source $I_4$, the collector current ($I_{C1}$) of transistor $Q_1$ corresponds to:

$$I_{C1} = I_1 - I_4 = (V_{REF} \cdot K_R \cdot K_1) - (V_{IN} \cdot K_V \cdot K_1) \quad \text{(Eq.6)}$$

As described before, with respect to Eq.3, the voltage across the capacitor is determined by $I_{C8}/C$. However, since current source I4 is included in FIG. 10, current $I_{C8}$ will include portions of current I1 and I4 through the various current mirror arrangements such that, the resulting ramp signal (RAMP) has a slope ($m_e$) that is given by:

$$m_e = \frac{(V_{REF} \cdot K_R - V_{IN} \cdot K_V)}{V_I} \cdot \frac{K}{K_I} \cdot \frac{I_{BIAS}}{C} \quad \text{(Eq.7)}$$

Eq.7 is in substantially the same form as Eq.4 such that adjustment of various constants can be employed to adjust the slope of the ramp signal as previously described.

Example Capacitive Adjustment Mechanisms for Slope Compensation

As described above with respect to FIGS. 7-10, the slope of the inductor current is adjusted by changing the scaling constants associated with the various gain blocks. For example, the current mirror ratio as set by scaling constant K in FIGS. 8 and 10 can be varied to change the slope compensation of the inductor current. Some alternative ways to scale the slope compensation are illustrated by FIGS. 11 and 12.

Figure 11:
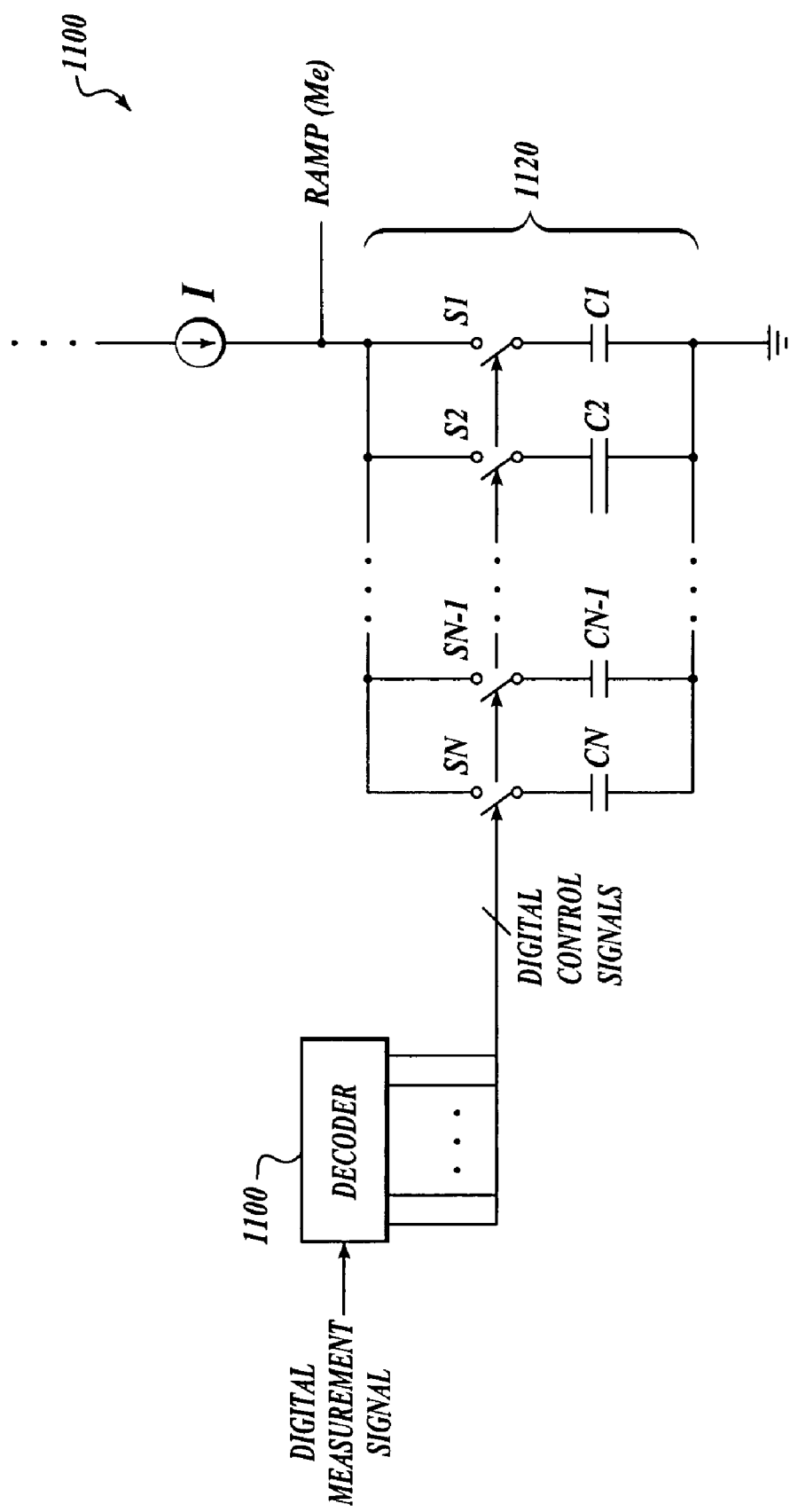
FIG. 11 illustrates an example schematic diagram for a ramp generator circuit.

FIG. 11 illustrates an example schematic diagram for a ramp generator circuit (1100) that is arranged to operate in accordance with an aspect of the present invention. The ramp generator circuit (1100) may be configured to operate as a portion of the control circuit for the power switch in the switching regulator. Ramp generator circuit 1100 includes a decoder logic block (1110), an array of capacitor circuits (1120), and a current source (I).

A digital measurement signal is obtained in the system (e.g., see FIG. 1), where the digital measurement signal corresponds to a measurement such as a value for the inductor (or average value as may be desired) in the switching regulator. The digital measurement signal is provided to decoder logic block 1110, which is arranged to provide an array of digital control signals. Capacitor circuits 1120 are arranged as a set of selectable capacitors that are selectively coupled in parallel to one another based on the array of digital control signals from the decoder logic block (1110). The effective total capacitance from the array of capacitor circuits operates as a single capacitive value for the ramp capacitor (C) in the ramp generator circuit, where the slope of the ramp is variable in response to the digital measurement signal.

Figure 12:
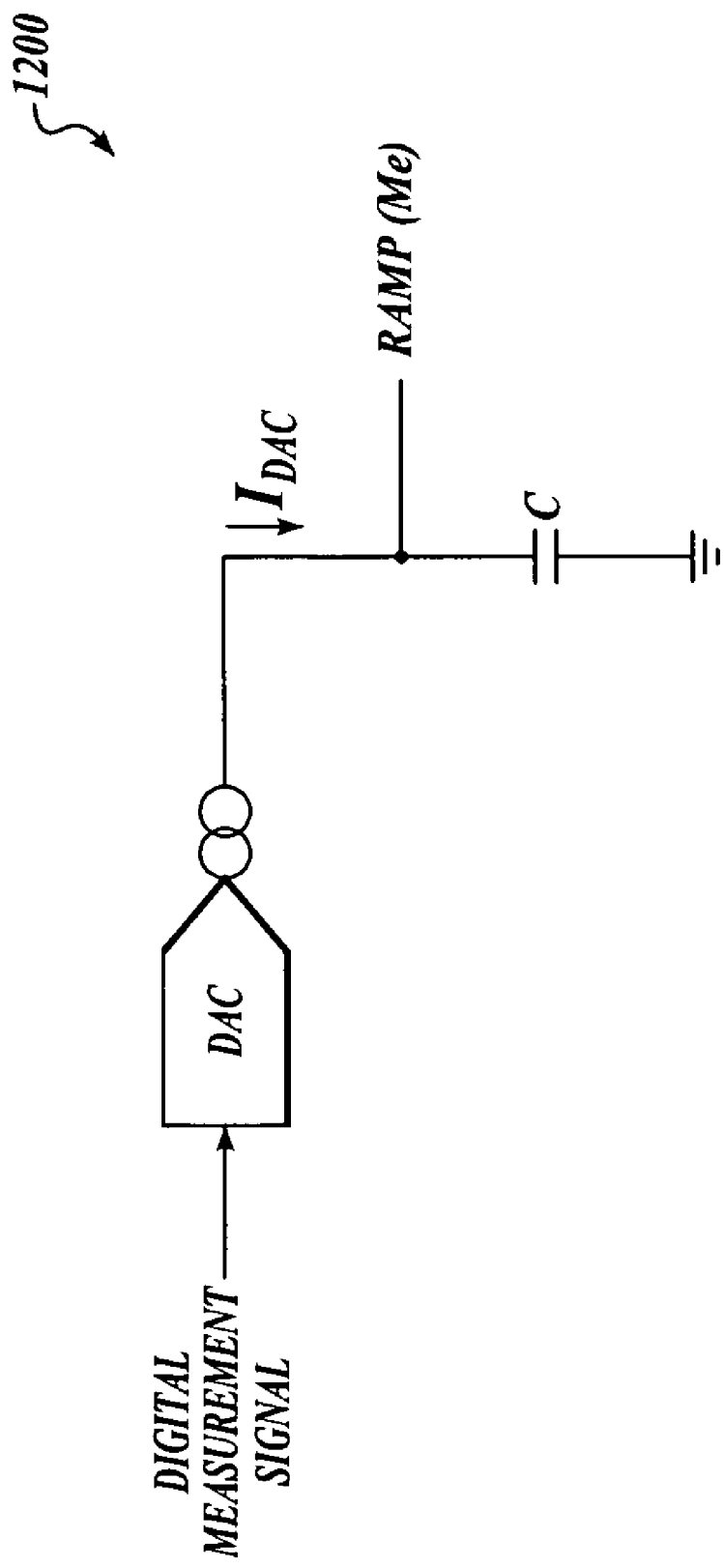
FIG. 12 illustrates another example schematic diagram for a ramp generator circuit, arranged in accordance with aspects of the present invention.

FIG. 12 illustrates another example schematic diagram for a ramp generator circuit (1200) that is arranged to operate in accordance with an aspect of the present invention. The ramp generator circuit (1200) may be configured to operate as a portion of the control circuit for the power switch in the switching regulator (e.g. see FIGS. 1-6 and related discussion). Ramp generator circuit 1200 includes a digital-to-analog converter (DAC) circuit that is responsive to a digital measurement signal (e.g., a measured value for the inductor). The DAC circuit is arranged to provide a programmable output current to the capacitor in the ramp circuit such that the slope of the inductor current is adjusted.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for adjusting slope compensation in a switching regulator that includes an inductor, wherein a current flows through the inductor during operation of the switching regulator, the method comprising:
   measuring a parameter associated with the inductor, wherein the parameter corresponds to a first slope associated with the current flowing in the inductor;
   providing a measurement signal that is associated with the measured parameter such that the measurement signal is indicative of the first slope;
   dynamically adjusting a second slope associated with a ramp signal in response to the measurement signal; and
   compensating a response associated with a control loop in the switching regulator with the ramp signal such that the control loop is responsive to changes in inductor current slope.

2. The method of claim 1 wherein dynamically adjusting the second slope associated with the ramp signal comprises at least one of dynamically changing a capacitance value that is associated with a ramp generator, and dynamically changing a charging current that is associated with the ramp generator circuit, wherein the second slope of the ramp signal is proportional to the ratio of the charging current to the capacitance value such that the second slope of the ramp signal is responsive to the measurement signal.

3. The method of claim 1 further comprising: monitoring a reference signal that is related to an output voltage of the switching regulator, dividing the reference signal with the measurement signal to provide a ratio, and changing the second slope associated with the ramp signal in response to the ratio such that the second slope of the ramp signal is responsive to the measurement signal and the output voltage.

4. The method of claim 1, wherein dynamically adjusting the second slope associated with the ramp signal corresponds to dynamically adjusting the second slope associated with the ramp signal in response to the first slope according to at least one of: a matched slope, a fraction of a downward slope associated with the inductor current, and a multiple of the downward slope associated with the inductor current.

5. The method of claim 1, further comprising: monitoring an output voltage associated with the switching regulator, and dynamically adjusting the second slope that is associated with the ramp signal in response to the monitored output voltage.

6. The method of claim 1, further comprising: monitoring an output voltage associated with the switching regulator to provide a first current signal, generating a second current signal as the measurement signal, summing the first current signal and the second current signal, and adjusting the second slope associated with the ramp signal in response to the sum of the first current signal and the second current signal.

7. The method of claim 6, wherein adjusting the second slope associated with the ramp signal corresponds to an integration of the sum of the first current signal and the second current signal with a capacitor circuit.

8. An apparatus for adjusting slope compensation in a switching regulator that includes an inductor, wherein a current flows through the inductor during operation of the switching regulator, the apparatus comprising:
   a means for measuring a parameter that is associated with the inductor, wherein the parameter corresponds to a first slope associated with the current flowing in the inductor;
   a means for providing a measurement signal that is associated with the measured parameter such that the measurement signal is indicative of the first slope;
   a means for dynamically adjusting a second slope that is associated with a ramp signal in response to the measurement signal; and
   a means for compensating a response that is associated with a control loop in the switching regulator with the ramp signal such that the control loop is responsive to changes in the first slope associated with the current flowing in the inductor via the measurement signal.

9. The apparatus of claim 8, further comprising: a means for monitoring a reference signal that is related to an output voltage of the switching regulator, a means for dividing the reference signal with the measurement signal to provide a ratio, and a means for changing the second slope that is associated with the ramp signal in response to the ratio such that the second slope of the ramp signal is responsive to the measurement signal and the output voltage.

10. The apparatus of claim 9, wherein the means for dynamically adjusting the second slope associated with the ramp signal is arranged to adjust the second slope associated with the ramp signal in response to the measured current slope according to at least one of: a matched slope, a fraction of a downward slope associated with the inductor current, and a multiple of the downward slope associated with the inductor current.

11. The apparatus of claim 8, further comprising: a means for monitoring an output voltage associated with the switching regulator, and a means for dynamically adjusting the second slope that is associated with the ramp signal in response to the monitored output voltage.

12. The apparatus of claim 8, further comprising: a means for monitoring an output voltage associated with the switching regulator to provide a first current signal, a means for generating a second current signal as the measurement signal, a means for summing the first current signal and the second current signal, and a means for adjusting the second slope associated with the ramp signal in response to the sum of the first current signal and the second current signal.

13. The apparatus of claim 12, wherein the means for adjusting the second slope associated with the ramp signal is arranged to integrate the sum of the first current signal and the second current signal with a capacitor circuit.

* * * * *